US012103191B2

(12) United States Patent
Caldarola

(10) Patent No.: US 12,103,191 B2
(45) **Date of Patent: *Oct. 1, 2024**

(54) BEAN END CUTTING DEVICE

(71) Applicant: Glenn Caldarola, Reston, VA (US)

(72) Inventor: Glenn Caldarola, Reston, VA (US)

( * ) Notice: Subject to any disclaimer, the term of this patent is extended or adjusted under 35 U.S.C. 154(b) by 732 days.

This patent is subject to a terminal disclaimer.

(21) Appl. No.: 17/208,089

(22) Filed: Mar. 22, 2021

(65) Prior Publication Data

US 2021/0206012 A1 Jul. 8, 2021

Related U.S. Application Data

(63) Continuation-in-part of application No. 16/038,308, filed on Jul. 18, 2018, now Pat. No. 10,966,449.

(51) Int. Cl.

| | |
|---|---|
| ***B01F 23/237*** | (2022.01) |
| ***B01F 23/236*** | (2022.01) |
| ***B01F 25/441*** | (2022.01) |
| ***B26B 29/06*** | (2006.01) |
| *B01F 101/17* | (2022.01) |

(52) U.S. Cl.

CPC ........ *B26B 29/063* (2013.01); *B01F 23/2362* (2022.01); *B01F 25/44161* (2022.01); *B01F 25/44163* (2022.01); *B01F 25/44164* (2022.01); *B01F 25/44167* (2022.01); *B01F 2101/17* (2022.01)

(58) Field of Classification Search

CPC .. A23N 15/003; A23N 15/001; A23N 15/005; A23N 15/02; A23N 15/04; A23N 15/08; A23N 15/12; B26D 3/26; Y10K 83/695

USPC .... 99/546, 636, 635, 637, 645; 83/442, 167, 83/762; 30/286, 289, 114

See application file for complete search history.

(56) References Cited

U.S. PATENT DOCUMENTS

| | | | | |
|---|---|---|---|---|
| 331,990 | A * | 12/1885 | Merwin | 85/167 |
| 1,202,158 | A * | 10/1916 | Caldwell | B26D 1/547 83/762 |
| 1,315,056 | A | 9/1919 | Tubbs | |
| 1,328,301 | A | 1/1920 | Serrell | |
| 1,462,717 | A | 7/1923 | Maus | |
| 1,583,725 | A | 5/1926 | Lowry | |
| 1,913,837 | A | 6/1933 | Haynes | |
| 2,092,103 | A | 9/1937 | Blackeney et al. | |
| 2,104,278 | A | 1/1938 | Shultz | |
| 2,352,125 | A | 6/1944 | Sager | |
| 2,652,087 | A | 9/1953 | Turpin | |
| 3,348,591 | A | 10/1967 | Carrasco | |
| 3,817,138 | A | 6/1974 | Lasker | |
| 3,971,273 | A | 7/1976 | Peters et al. | |
| 4,125,046 | A | 11/1978 | Kroh et al. | |
| 4,133,238 | A | 1/1979 | Jacobs | |
| 4,249,445 | A | 2/1981 | Browning | |
| 4,648,300 | A | 3/1987 | Hassenfelt, Jr. | |
| 4,964,323 | A | 10/1990 | Fortney | |
| 5,115,704 | A | 5/1992 | Hyman | |
| 5,440,959 | A | 8/1995 | Bindon et al. | |
| 5,492,042 | A | 2/1996 | Salvia et al. | |
| 5,524,514 | A | 6/1996 | Hadaway et al. | |
| 8,215,218 | B2 | 7/2012 | Al-Heraibi | |
| 8,857,325 | B2 * | 10/2014 | Brown | B26D 3/185 83/167 |

(Continued)

*Primary Examiner* — Reginald Alexander

(74) *Attorney, Agent, or Firm* — Clark & Brody LP

(57) ABSTRACT

A handheld bean end cutting device.

9 Claims, 15 Drawing Sheets

(56) References Cited

U.S. PATENT DOCUMENTS

2010/0224041 A1 * 9/2010 Melton .................... B26D 1/09
83/167

* cited by examiner

BEAN END CUTTING DEVICE

FIELD OF THE INVENTION

This invention relates to a novel bean end cutter for use in the food service industry, particularly for the home, catering service, restaurant, and hotel where there is a need for an inexpensive hand tool to facilitate the trimming off of bean ends from a bunch of beans at one time.

BACKGROUND OF THE INVENTION

This invention relates to a novel tool to facilitate the cutting bean ends from a plurality of bean pods having varying lengths. The bean pods include all types of beans having a stringy or otherwise objectionable end that, when removed, is more attractive and delectable to those wishing to fully enjoy a bean dish. This novel tool or device is preferably handheld, allowing convenient storage in a kitchen drawer or cabinet. Being quite portable, this allows the food preparer to rapidly remove the undesirable stringy bean ends from several servings of beans, thereby saving time for an operation which is typically performed on each individual bean by a cook or chef. To save time, many food preparers elect not to remove the objectionable bean ends, which detracts from the dining experience.

As will become apparent, none of the prior art, described below, has identified the problem that is solved by Applicant. Accordingly, none of the prior art below teaches or suggests Applicant's inventive device and/or method to remove bean ends from a plurality of beans.

Blackeney et al, U.S. Pat. No. 2,092,103 describes an automatic bean cutter for automatically cutting bean pods into lengths desired for canning. Also described, is the use of trough shaped flights to align the beans to be at right angles to the cutting knifes or disks.

The following references described below are not designed for the cutting of beans in any fashion, but are merely cited as they do apply to cutting food stuffs:

Jacobs, U.S. Pat. No. 4,133,238 describes a food handling device, particularly for an open-ended tray having a single pair of cutting slots located halfway down tray for cutting a sandwich in half. The open tray end allows the cut sandwich to slide into another container, for storage.

Browning, U.S. Pat. No. 4,249,445 is drawn to a food slicing apparatus and a pair of opposed parallel planar faces having formed therein, a pair of laterally spaced guide slots to allow a cutting blade to cut bread, rolls and the like.

Kroh et al, U.S. Pat. No. 4,125,046 describes a food slicer for cutting foods including bread, eggplants, cookie dough bread. In use, the item to be cut is passed over a base upon which there is secured a frame made of rigid sheet metal forming an inverted U-shape, and which includes an opposite, vertical side wall and a horizontal top wall. A series of parallel slots extend around the three sides of the frame. Each slot is of a width to permit a knife blade to be inserted.

Fortney, U.S. Pat. No. 4,964,323 also teaches a bread cutting apparatus having two opposing parallel slotted side walls. Unlike Kroh et al '046, mentioned above, the top is open to receive a loaf of bread. Slot openings in the side walls are used as a cutting guide for the knife.

Serrell, U.S. Pat. No. 1,328,301, teaches a single cut bread board wherein a cutting guide, consisting to two parallel slots are attached to a cutting board.

Shultz, U.S. Pat. No. 2,104,278 discloses a bread slicer guide having two parallel side walls open at the top for receiving a loaf of bread. the end of side is used as cutting guide to cut a slice of bread at that end. Also, an eccentric stop is positioned at the cutting end device to control the width of the slice of bread being cut.

Hyman, U.S. Pat. No. 5,115,704 discloses a bread cutter box having two parallel side walls open at the top for receiving a loaf of bread. In Hyman, each side wall can be placed into one of a series of parallel slots to adjust for the width of the loaf of bread.

Lastly, concerning baked items is, the US patent to Bindon et al, U.S. Pat. No. 5,440,959, directed to a collapsible bread slicing appliance having two opposing parallel side walls having a plurality of cutting slots at one end. Also, attached is a wall serving as an end stop to hold the loaf of bread while making a series of cuts using one of the slots provide at the loaf end.

Moving now to the deli category, Lasker, U.S. Pat. No. 3,817,138 and Peters et al U.S. Pat. No. 3,971,273 both teach the use of a cutting guide mounted at the end of a cutting board for the hand slicing of meats. The slab of meat is introduced at the other open end of the board.

In the dessert area, Lowry, U.S. Pat. No. 1,583,725 relates to an ice cream brick slicer and receptacle. Here, Lowry describes a structure similar to Fortney, above, having two opposing parallel walls having a series of slots serving as cutting guides for the cutting of ice cream bricks. The ice cream brick slicer of Lowry is equipped with a stop plate at one end to secure the ice cream brick during cutting.

Lastly, the patents to Salvia et al, U.S. Pat. No. 5,492,042, relates to a work piece holder for shaft cutting; Hadaway et al, U.S. Pat. No. 5,524,514, to a table saw fence; and US patent to Carrasco U.S. Pat. No. 3,348,591, to a saw guide assembly. These patents are not analogous to cutting food items but are cited merely to illustrate other examples of cutting materials using an end guide.

The prior art described above alone or in combination, do not teach or suggest the process or structure of Applicant's novel invention described below.

SUMMARY OF THE INVENTION

The instant invention is drawn to a bean cutting device and process of use wherein beans are inserted into an enclosure formed by a set of opposing primary side panels and a pair of opposing end alignment panels is attached to a bottom panel. A pair of opposing slots are formed at each of the enclosure ends, serving as cutting guides. The opposing slots can be formed between the primary side panels and the end alignment panels. The width of the cutting slot and the distance of the cutting slot relative to the end alignment panel are parameters that can be accommodated by the design of the instant invention. For example, the cutting slots can be formed between the end alignment panels and the primary side panels. In a preferred embodiment, the cutting slot is separated from the end alignment panel by incorporation of an auxiliary side panel, forming one edge of the cutting slot. The other edge of the cutting slot is preferably formed by the edge of one of the primary side panels. In this embodiment, the end alignment panels are sufficiently distanced from the cutting guide slots, by the auxiliary side panels, which aids in the confinement of the beans within the area of the end alignment panels, and to allow cut-off of the unwanted bean tip section from the rest of the bean pods.

In use, the user places handful(s) of beans into a top opening of the device enclosure. The user then shakes the handheld device, tilting it in the direction of one of the end alignment panels, so that all the beans, of varying length, are all aligned against an end alignment panel. The user then places a knife or other cutting implement into a set of cutting slots located near one of the end alignment panels to cut off all the bean end sections. The user then tilts the device in the other direction and performs the same operation with the set of slots at the other enclosure end to remove the remaining bean ends.

Finally, the user in one embodiment, inverts the hand-held bean cutter with their hand over the enclosure opening retaining the main body of the bean pods, wherein, scrap bean pod ends fall into a discard location, leaving the trimmed pods behind. Optionally, an enclosure cover, lid or bar cover retains the cut beans while the cut bean ends are conveniently discarded.

There are a variety of modifications possible which are also covered by this application which are detailed in the Description of the preferred embodiment section.

BRIEF DESCRIPTION OF THE DRAWINGS

FIG. 6 D illustrates a side view of FIG. 6C.

FIG. 11 illustrates the lid 13 provided with cutouts to assist grasping of the bean end cutter through lid 13.

DESCRIPTION OF THE PREFERRED EMBODIMENTS

Figure 1A:
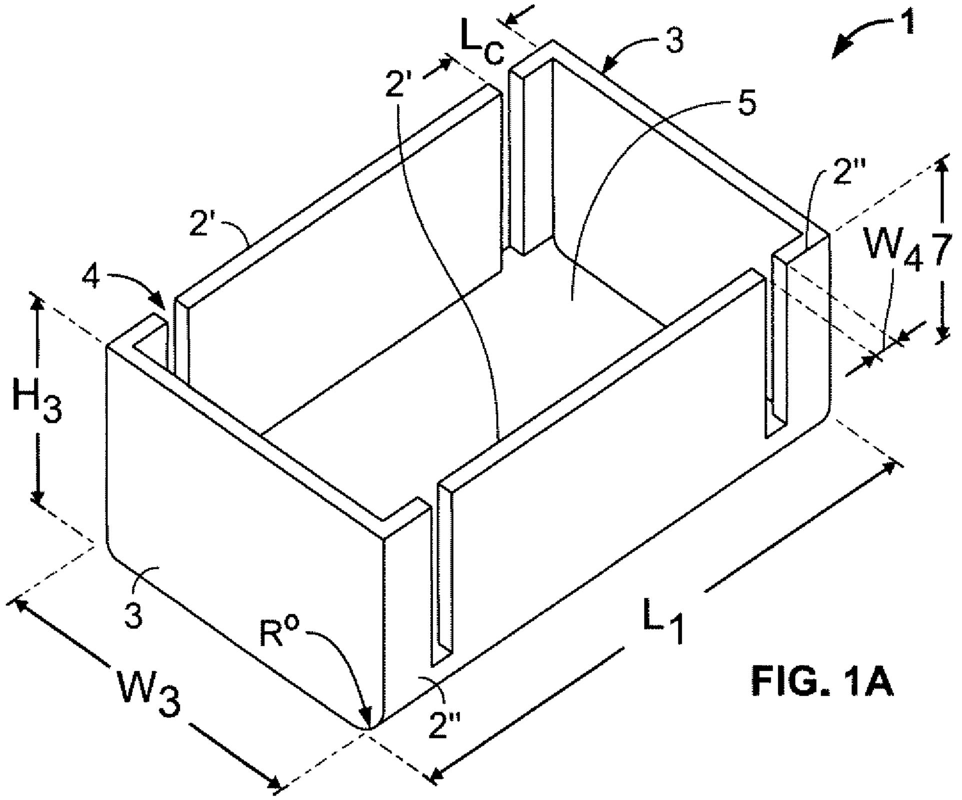
FIG. 1A depicts a version of the present invention consisting of an open enclosure with opposing side panels forming a slot with adjacent auxiliary side panels. Opposing end alignment panels are situated at each end of the enclosure.

The Summary of the Invention section describes, in general terms, the structure as illustrated and use of the invention as depicted in FIGS. 1A and 1 B.

Figure 1B:
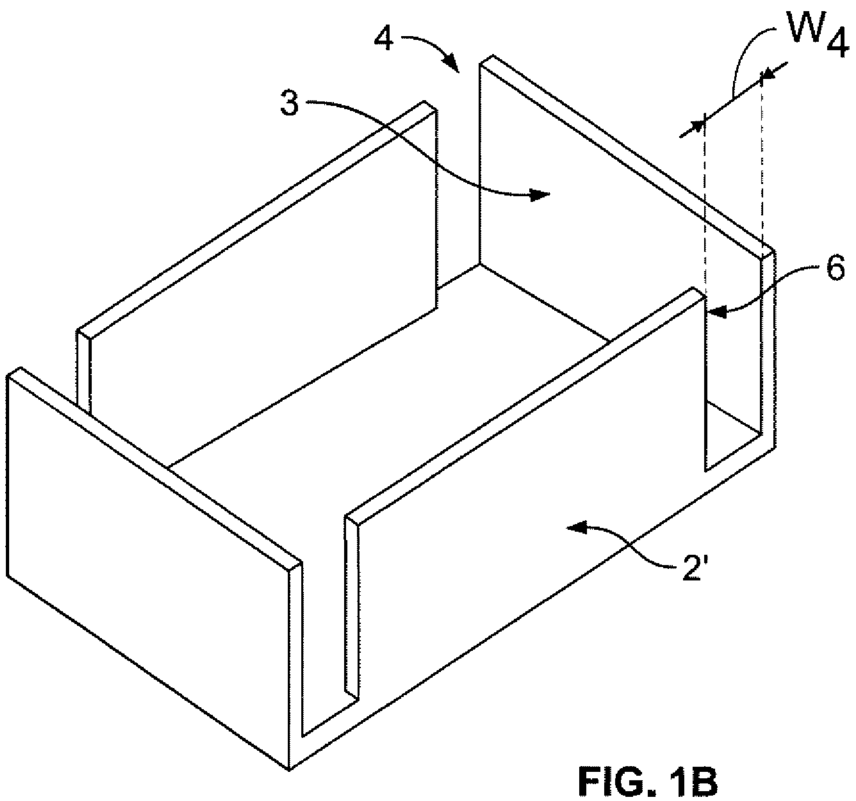
FIG. 1B depicts a basic version of the present invention consisting of an open enclosure with opposing slotted side panels and opposing end alignment panels situated at each end of the enclosure. This design omits the auxiliary side panel illustrated in FIG. 1A.

More specifically, FIG. 1A depicts a basic version of the present invention consisting of open enclosure 1 with two opposing primary panels 2' and opposing end alignment panels 3, situated at each end of the enclosure. In this embodiment, a pair of auxiliary side panels 2" are situated adjacent to each primary side panel 2', to form slot openings 4 between the end surfaces of the side panels 2 and the end surfaces of the adjacent auxiliary side panels 2". Bottom panel 5 is attached to primary side panels 2', auxiliary side panels 2" and alignment end panels 3. Slot openings 4, having slot width $W_4$, are located at a distance equal to the minimum bean end cut length $L_c$, measured from the inner surfaces of alignment end panels 3. FIG. 1B illustrates another embodiment wherein there are no auxiliary side panels. In this less preferred embodiment, slot 4 having width $W_4$, is formed between the inner surface of end alignment panel 3, facing the adjacent edge surface 6 of one of the auxiliary side panels 2".

Figure 2:
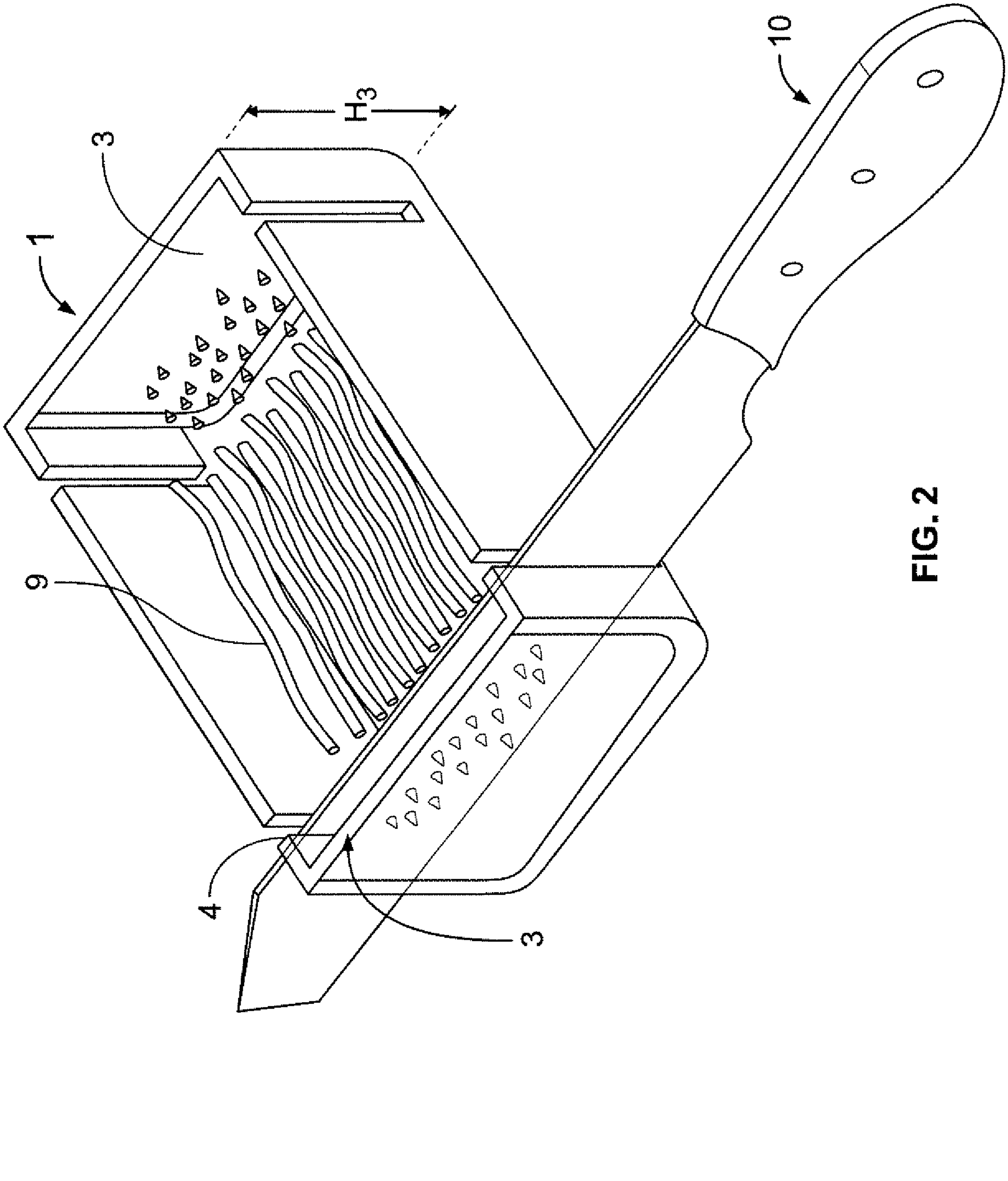
FIG. 2 illustrates the invention of FIG. 1A in use, showing a cutting blade inserted into the novel bean end cutter to cut aligned bean pod ends at one of the alignment end alignment panels.

Turning for the moment to FIG. 2, the food preparer inserts the desired amount of beans pods 9 into the open top area of enclosure 1, up to the height of the enclosure $H_3$. The preparer then grasps the enclosure 1, shaking and tilting it, so that substantially all the ends of the enclosed bean pods 9, of varying lengths, line up against one of the inner surfaces of the end alignment panels 3. The preparer then preferably rests the enclosure, on a fixed working surface and passes a knife or cutting implement 10 through a set of opposing slot openings 4 to remove the ends of the plurality of bean pods 9 in one operation. The above steps are repeated to cut the bean ends at the other side of the bean pods which are brought into contact with the other alignment end panel 3 at the opposite end of the enclosure.

Referring again to the embodiment of FIG. 1A, it is more convenient when enclosure width $W_3$ is small enough allow the user to be able to grasp at least most of the top opening in enclosure 1. This helps to keep the plurality of bean pods confined within the enclosure 1, with the preparer's hand during the shaking and tilting operation. Also, after cutting both ends of the enclosed bean pods, the enclosure is advantageously inverted so that the plurality of bean pods is retained by the preparer's hand while all the bean pod ends fall outside of the enclosure 1 for disposal. Preferably, the enclosure is placed over a cutting board for collection of the bean ends for later disposal or is placed directly over a waste disposal area.

As will become apparent later, there are other modifications (See FIG. 4A, 4B, and FIG. 9B), which permits larger widths $H_3$ not dictated by the size of a person's hand.

It is preferable that the enclosure 1 be hand-held to inexpensively facilitate the shaking and tilting and disposal operation. However, other designs not illustrated, could be designed so that the enclosure is made to shake and tilt on a working surface without being manually supported over the working surface.

Minimum end cut length $L_c$, as shown in FIG. 1A, is fixed. The minimum end cut length is chosen to accommodate most common bean varieties. In the fixed slot width $W_4$ design of FIG. 1A, minimum end cut length $L_c$ is typically from about 0.125 inch to about 0.75 inch and most preferably between 0.25 and 0.5 inch. Other lengths can be selected by one of ordinary skill in the art as dictated by the bean variety contemplated. The bean end cutter of this invention is intended to accommodate any bean pod that can fit or made to fit inside enclosure 1. For example, beans types which are longer that a particular device length $L_1$, can be cut in bunches to fit within the enclosure, and the tilting, alignment and cutting operations performed on each precut bunch.

Slot width $W_4$ must be carefully selected. The slot width $W_4$, at minimum, must accommodate the thickness of the knife or cutting blade. However, larger slot widths $W_4$ allow the user to more easily insert a knife or equivalent cutting implement into the slot openings 4. Even larger, slot openings widths $W_4$, permit the user to customize end cut lengths by providing more cutting locations within the slot 4.

There is, however, an upper limit to slot width $W_4$, that is permissible in the design shown in FIG. 1A. When $W_4$ is too large, some of the beans near the slotted side panels 3 may slip through an overly wide slot. In the design of FIG. 1A, fixed slot width $W_4$ are typically from 0.125 to about 1 inch, more preferably between 0.25 and 0.5 inch.

As shown in FIG. 1A, auxiliary side panels 2", help retain bean ends in the vicinity of primary side panel 2' and prevent slippage and loss of the beans through slot 4.

The problems associated in the fixed slot width design of FIG. 1A, 1B, for example is later addressed in the discussion of FIGS. 6A-6D and FIGS. 7A-7D FIG. 1B depicts a less preferred embodiment of the invention as illustrated in FIG. 1A. In this design, auxiliary side panels 2" are omitted. In the absence of the primary side panels of FIG. 1A, slot opening 4, having slot width $W_4'$ are measured from the enclosure inside surface of primary alignment end panels 3' and end surfaces of the primary side panels 2', facing primary alignment end panels 3'.

Figure 3A:
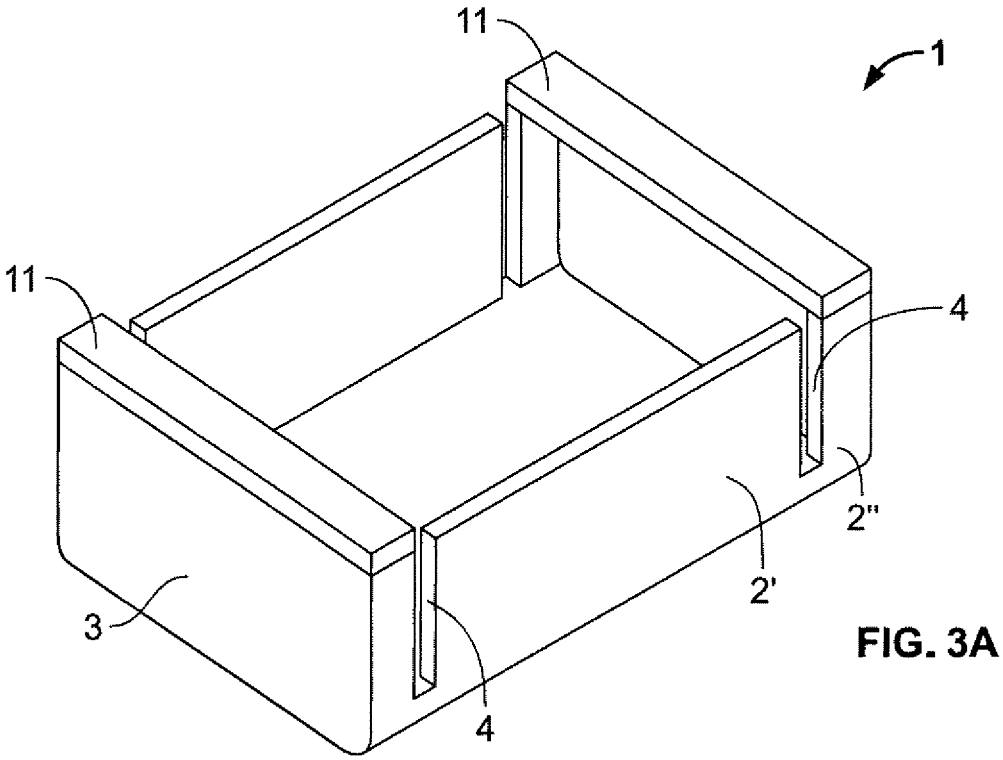
FIG. 3A modifies the base version of FIG. 1A by adding top bar members at locations between the cutting slot and alignment end alignment panels.
Figure 3B:
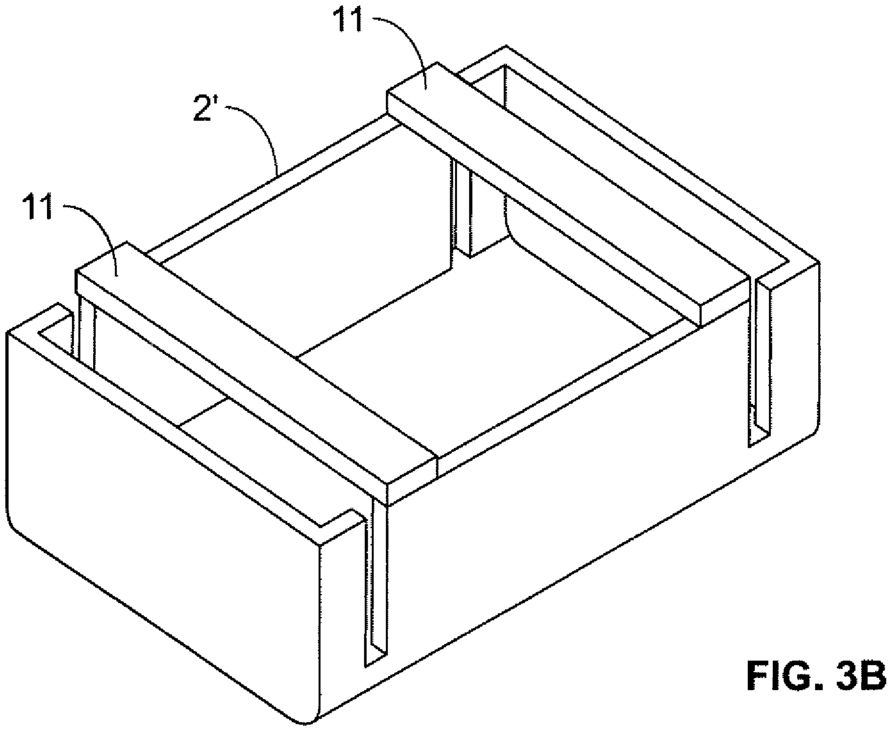
FIG. 3B illustrates the inclusion of top bar members located on the side panels.

FIGS. 3A and 3B illustrate the addition of top retaining members which may comprise a sheet, bar or rod element, for example, to help prevent the bean pods from escaping over the end alignment panels when performing the tilting and shaking operation described in FIG. 2. For example, in FIG. 3A, two top retaining members 11 are positioned at each end of the enclosure 1 between the slot openings 4 and alignment panels 3.

FIG. 3B depicts another embodiment where the retaining members 11 are situated on the primary side panels 2', ahead of slot openings 4. The disadvantage this arrangement as compared with FIG. 3A is that the top retaining members, being ahead of slot openings 4 tends to block the removal of beans after both ends have been cut.

Figure 4A:
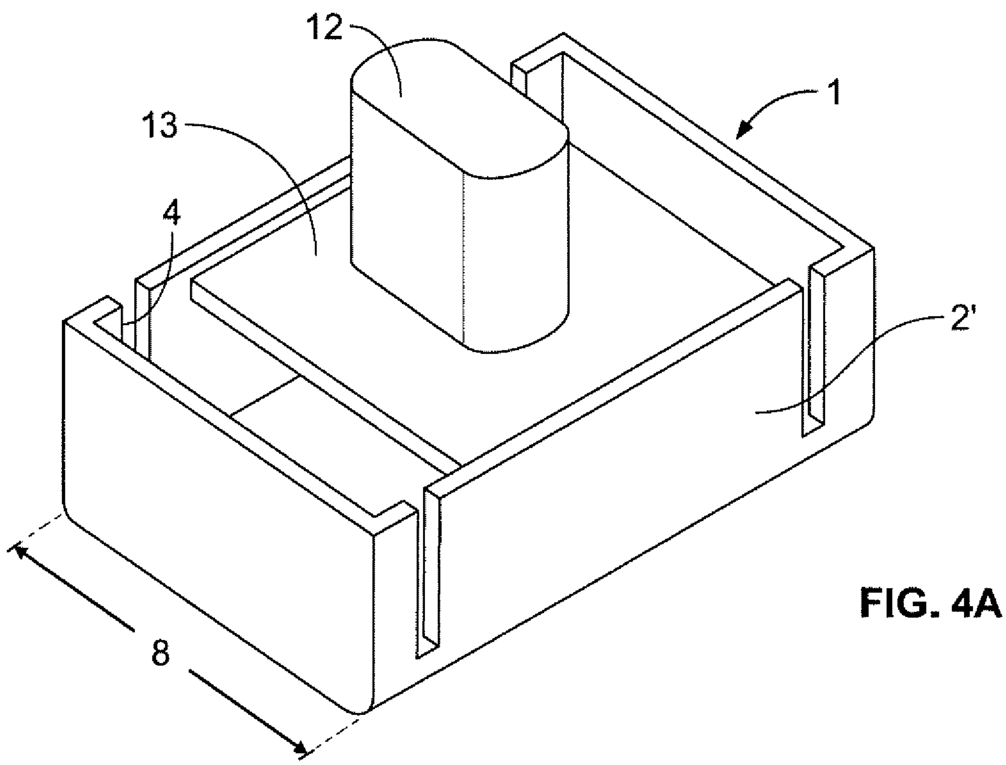
FIG. 4A shows an example of a plunger which helps keep the beans confined during the alignment and cutting steps.
Figure 4B:
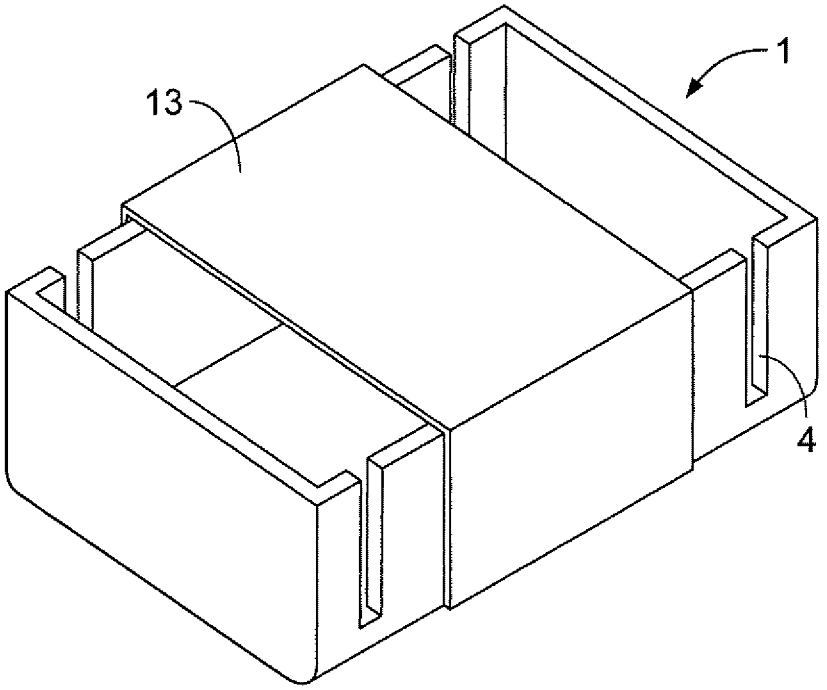
FIG. 4B shows an example of a removable top lid which helps keep the beans confined during the alignment and cutting steps.

FIGS. 4A and 4B illustrate the optional use of movable top retaining members 13. In this embodiment, FIG. 4A, shows a movable top retaining member in the form of a removable plunger 12. FIG. 4B shows the use of a top lid 13 movably, fits over the enclosure 1. It can slide freely over the top of the enclosure and/or can snap in place over the enclosure 1. Top lid 13, comprising retaining member 13 being moveable, can be removed from enclosure 1. Preferably, top lid or retaining member 13 covers just the primary side panels 2'. Referring back to FIG. 4A, plunger 12, is adapted to fit substantially against primary side panels 2', to keep the beans from escaping the enclosure. Also, plunger 12 is sized to fit within the enclosure 1 so as not to obstruct the slot openings 4.

The function of removable plunger 12 or top lid 13 is to assist the containment of bean pods within the enclosure during the tilting and shaking steps in the description of FIG. 2, for example. The use of the movable top retaining members 12 or 13, in FIGS. 4A and 4B, respectively, permits the use of much wider sized enclosures compared to the design shown in FIG. 3A. This is because a plunger 12 or top lid 13, can be designed to accommodate span extra wide enclosures compared to using one's hand to perform this operation. In addition, the use of an optional handle (not illustrated) attached to the enclosure 1, preferably at one of the primary side panels facilitates the hand-held operation of FIG. 4A when width 8 is larger than can be held in the user's hand.

Plunger 12 also provides more control during the cutting operation when the level of beans is well below the top of enclosure 1. Top lid 13 shown in FIG. 4B does not share this advantage. However, lid 13 is very helpful as it effectively provides a collection tray for all the cut beans remaining in the enclosure 1. For example, after the beans have been cut, the user inverts the enclosure 1 along with lid 13. The bean ends then fall through the open area between enclosure 1 and lid 13. The preparer then lifts the enclosure 1 from the now lower lid 13, which then serves as a tray retaining the final cut product. Though not illustrated, a peg, knob, or handle can optionally be attached to lid 13. Also not illustrated, another embodiment comprises providing hinges on or proximal to one of the top edges of primary side panels 2'. This allows top member 13 to either rest on an opposing primary side panel 2 and to pivot away from top enclosure opening to allow removal of the cut beans from the bean end cutter 1. The pivoting top member 13 can be made to lock on the opposing side panel 2'.

Alternatively, the top member 13, when made to pivot, can be spring loaded to stay in a closed position, thereby confining top enclosure 1. Further, a tab attached to the top panel is optionally provided to facilitate lifting of the top panel to allow removal of the cut beans from enclosure 1.

Figure 5A:
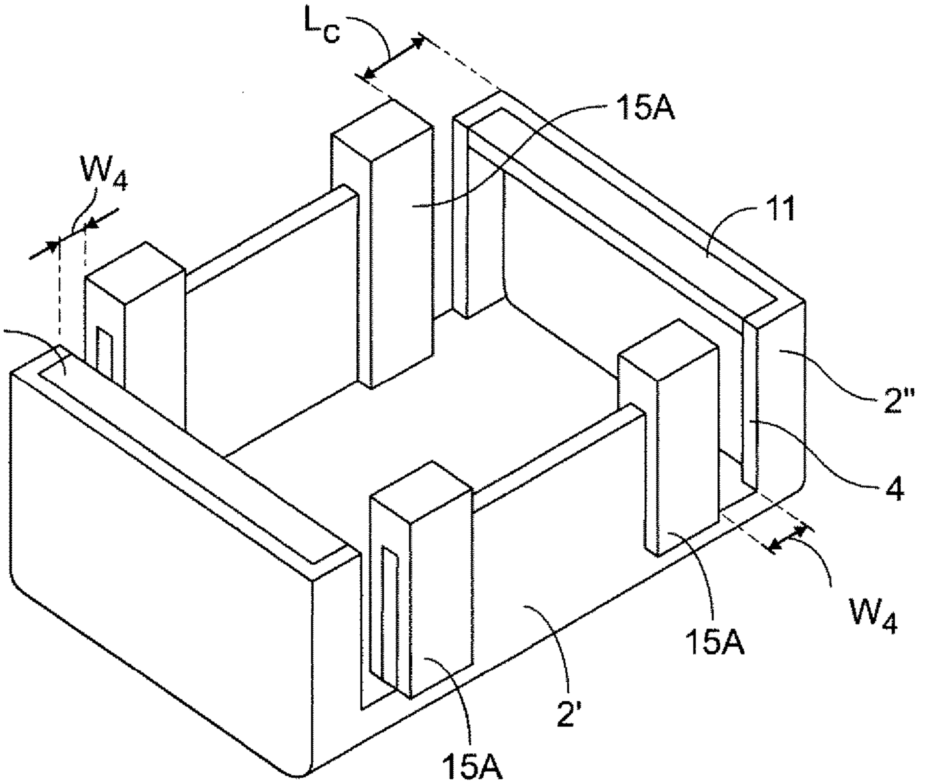
FIGS. 5A and 5B illustrate embodiments which relate to adjusting the location of the slot if required.

FIG. 5A shows another embodiment of the present invention wherein gap width, $W_4$, is adjustable through use of movable clip elements 15A, in sliding engagement, preferably with primary side panels 2'. Since the design of FIG. 5A utilizes auxiliary side panels 2'', gap 4 is adjusted by moving clips 15A along the side of auxiliary side panels 2'. Preferably, the exposed side of clip element 15A forms a cutting surface or guide, along which, a cutting implement is placed. In use, the food preparer can tailor the end cut length $L_c$, by sliding clips 15A along the ends of primary side panels 2' either towards or away from the alignment end alignment panel 3. As shown in FIG. 5A, end cut length, $L_c$, is preferably determined by the distance between the side of clip element 15A and the inside surface of end alignment panels 3.

FIG. 5A also illustrates a preferred embodiment shown in FIG. 1A, incorporating top members 11 attached to the auxiliary side panels 2'' to assist the containment of beans in the enclosure. Further FIG. 5A shows two sets of movable clips 15A movably attached to primary panels 2'. Clips 15A serve to adjust width $W_4$ of slot gap 4. This serves to simultaneously adjust bean end cut length $L_c$.

Figure 5B:
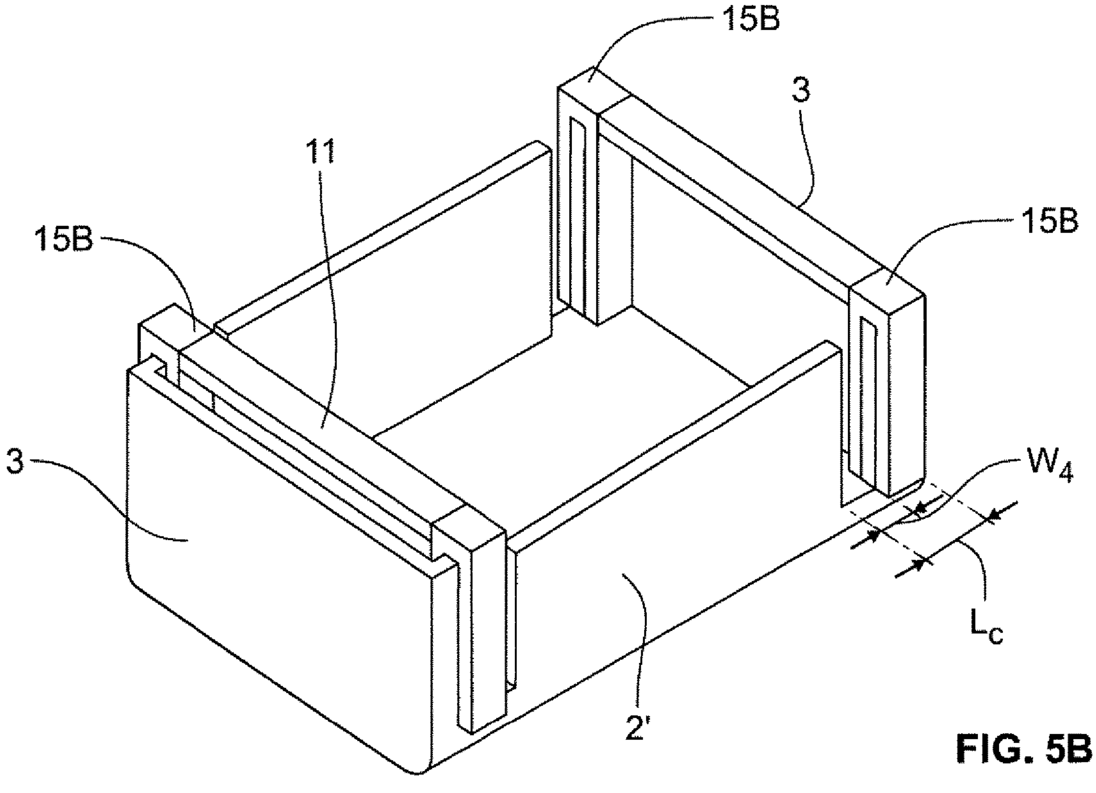

FIG. 5B, illustrates the use of a set of sliding clips 15B which slide along the top of auxiliary panel 2''. In this embodiment, slot width $W_4$ can be adjusted by movement to clips 15B. This operation also serves to simultaneously adjust bean end cut length $L_c$. $L_c$ is again the distance from the inside panel 3 from the edge of the end of primary side panel 2'.

Figure 6A:
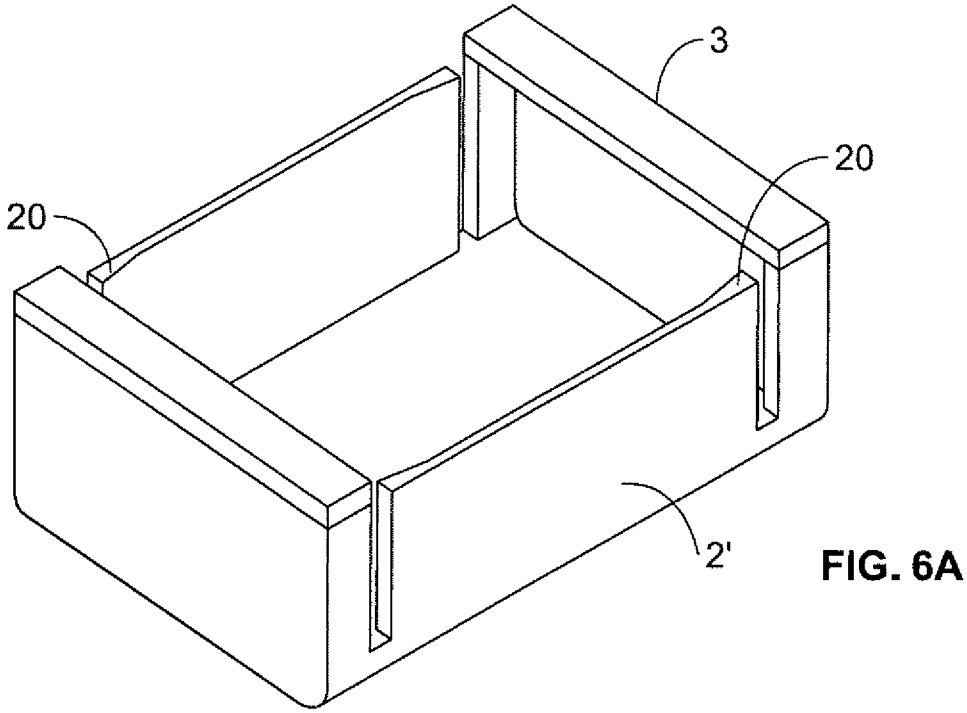
FIG. 6A depicts flared side panel which direct the beans away from exiting the slot openings. Also, the use of auxiliary side panels to form slots between the flared edge surface of the primary panels are incorporated. Note that the preferred use of top panels 11 are illustrated
Figure 6B:
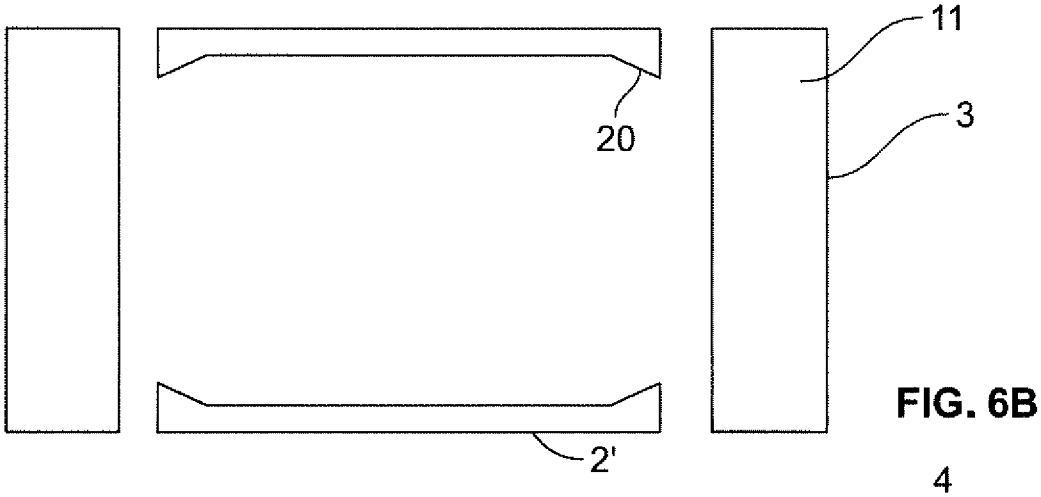
FIG. 6B illustrates a top view of FIG. 6A.

FIG. 5B also illustrates the optional use slidable top members 11, functioning as a movable coupling between clip elements 15B. In this embodiment, top member 11 attaches opposing clips 15B, so that clips 15B on each end of the enclosure can be moved as a pair. Member 11 can be grasped and used to adjust end cut lengths $L_c$ at one end of the device in one motion by the user. In this embodiment, cut length Le and slot width, $W_4$ can be simultaneously adjusted. A knob (not illustrated) can optionally be attached to each top member 11 to facilitate the movement of top member and attached set of clips 15B. FIGS. 6A and 6B illustrate an alternative embodiment which further modifies the device of FIG. 3A by inwardly flaring the internal sides of the primary side panel 2'. Flaring the primary side panels 2' inwardly towards the direction of the end alignment panels, further enhances confinement of the bean ends during cutting. In practice, flared portion 20 can be molded as a part of the primary side panels 2', or flared portion 20 can be simply bent from side panel body 2'. Alternatively, the flared portion 20 can be a separate piece attached to side panel body 2'.

Figure 6C:
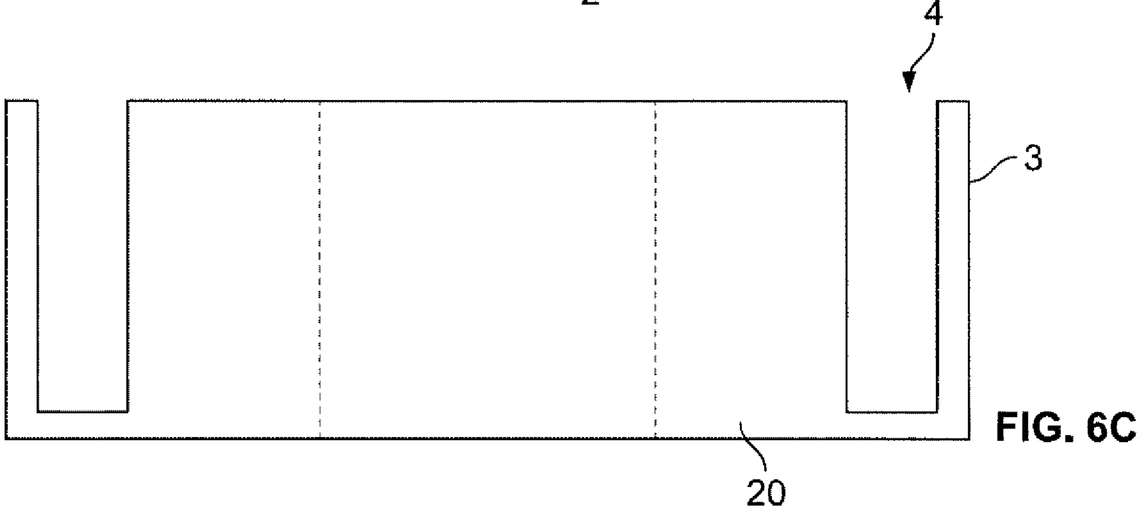
FIG. 6 C illustrates a top view the flared side panel embodiment of FIG. 6A, but forms a slot opening between the edge surface of the primary side panels and the inner surface of the end alignment panels.
Figure 6D:
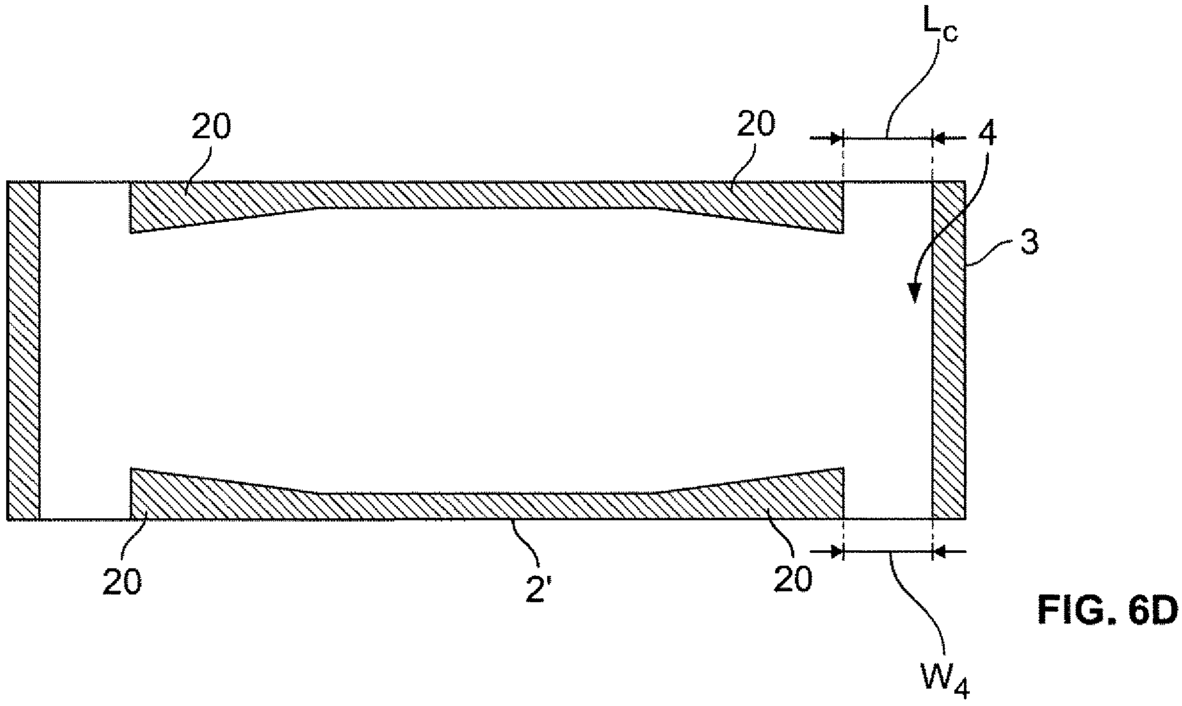

As explained earlier, FIG. 1B is a less preferred embodiment of FIG. 1A, which does not utilize auxiliary side panels 2''. FIGS. 6C and 6D further improve on the design of FIG. 1B, by incorporating flared portions at 20 their ends.

FIG. 6C shows a side view, while FIG. 6D shows a top view of the invention clearly illustrating flared portion 20 attached to primary side panel 2''. The design of FIG. 1B is substantially improved by incorporation of flaring portion 20 into the ends of the primary side panels 2'.

Figure 7A:
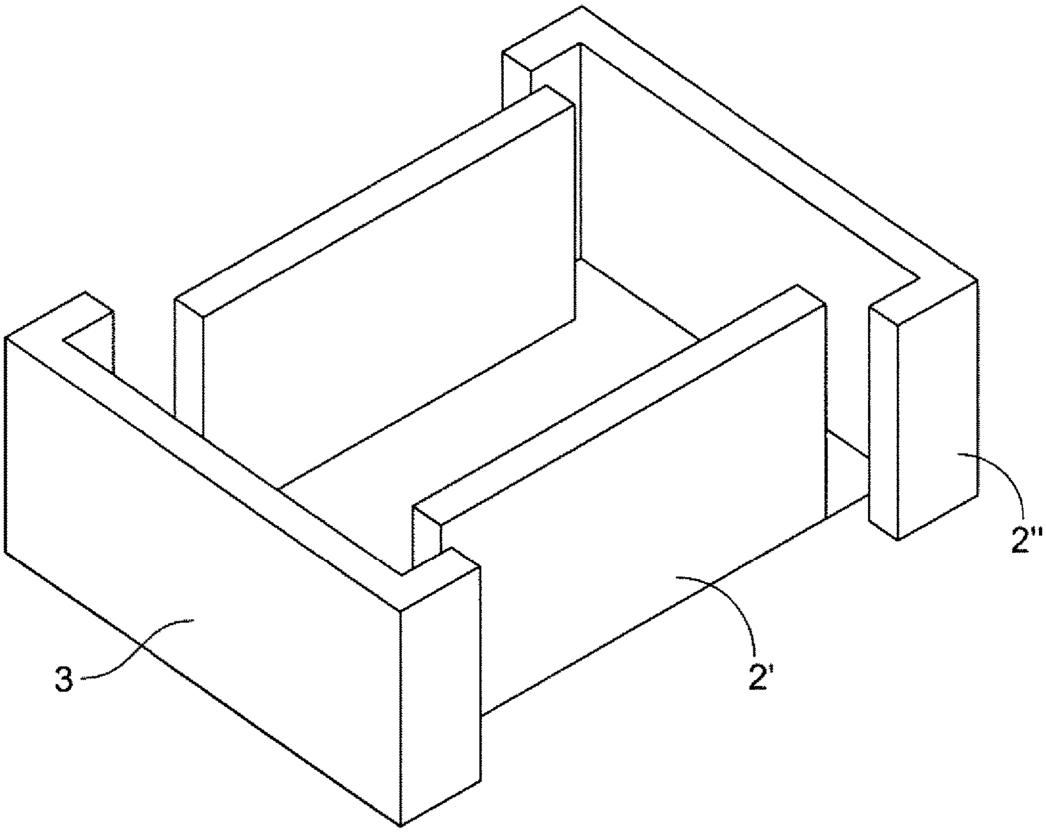
FIG. 7A illustrates the use of a wider width alignment end plates relative to the more narrowly spaced opposing primary side panels. This modification allows the use of larger fixed slot widths to minimize the egress of bean pods through a wider slot.
Figure 7B:
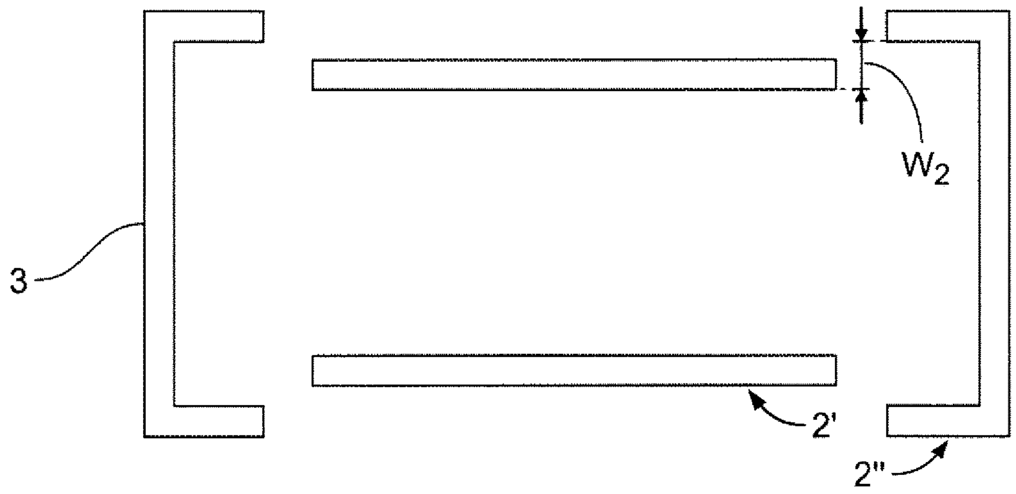
FIG. 7B illustrates a top view of FIG. 7A.

As an alternative to flaring the primary side panels 2' inwardly per FIGS. 6A, 6B, 6C, and 6D, it is also within the scope of the invention to offset primary side panels 2' inwardly within the enclosure relative to auxiliary side panels 2''. This configuration is illustrated in FIGS. 7A and 7B. Here the lateral distance $W_2$ between primary side panels 2' and auxiliary side panels 2'' is made such that beans are adequately confined within the enclosed area of the bean end cutter 1. This arrangement, as well as those in FIGS. 6A, 6B, 6C, and 6D, allow for larger gap sizes $W_4$ as compared to designs illustrated in FIGS. 1A and 1B. Other modification or conventional techniques incorporation to prevent egress of beans through slots 4 are within the scope of this invention.

FIG. 7A illustrates the use of a wider width alignment end panels 3, relative to the more narrowly spaced opposing primary side panels 2'. This modification allows the use of larger fixed slot widths to minimize the egress of bean pods through a wider slot.

FIG. 7B illustrates a top view of FIG. 7A, showing width $W_2$ that is formed between the inside surface of primary side panel 2' and the inside of auxiliary side panel 2''.

Width $W_2$ is at least 0.125 inches and can be established by one of ordinary skill in the art, given the particular slot width involved and the bean pod size anticipated.

Although not illustrated, and less preferred, auxiliary side panels 2'' can be omitted.

Figure 8A:
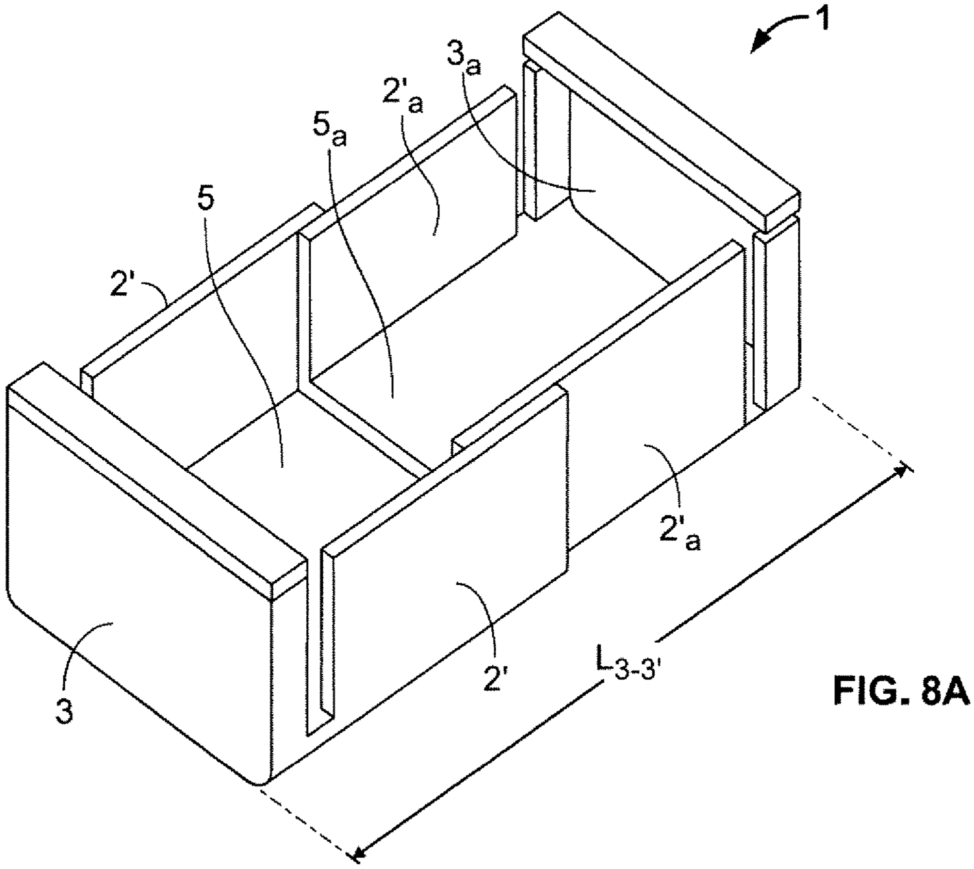
FIG. 8A, FIG. 8B and FIG. 8C depict a telescoping versions of FIG. 1A to accommodate for oversized beans.

FIG. 8A illustrates another embodiment of the present invention that allows the effective length $L_{3\text{-}3'}$ of bean end cutter 1 to be adjusted. Shown in this figure is essentially a bean end cutter 1 divided into two portions which can slide on one another to adjust the effective length $L_{3\text{-}3'}$ of bean end cutter 1. An outer portion is defined by side panels 2' connected to bottom panel 5 and end alignment panel 3. An inner portion is defined by side panels Ta connected to bottom panel 5*a* and end alignment panel 3*a*. In use, larger beans are accommodated by siding the inner portion relative to the other portion to increase the effective length $L_{3\text{-}3'}$ of bean end cutter 1.

Figure 8B:
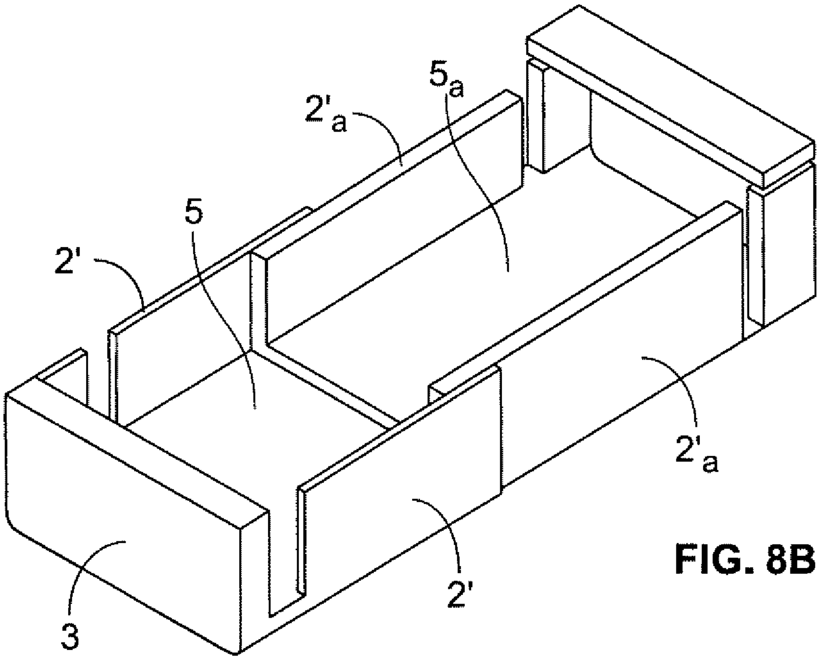
Figure 8C:
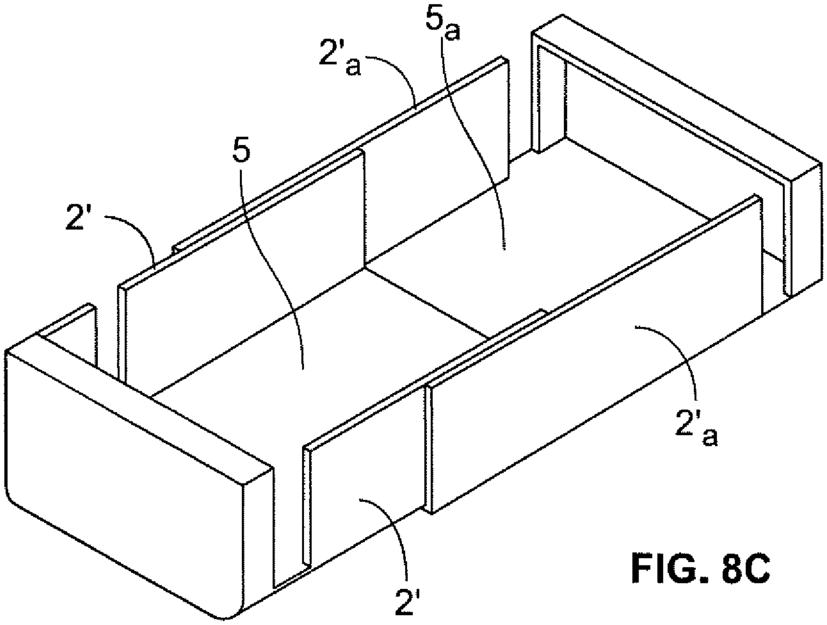

FIGS. 8B and 8C are included merely to illustrate that side panels 2' and Ta and bottom panels 5 and 5*a* can have a variety of thicknesses. FIG. 8B, for example, is illustrative of the outer portion being fabricated of a thin metal sheet, relative to an inner portion made of a with thicker panels made of plastic, for example.

Along the lines of the telescoping versions illustrated in FIGS. 8A, 8B, and 8C, it is also within the scope of the invention to make the width of the enclosure variable by making at least one of the side panels adjustable so that it can be positioned at several locations along the end alignment panels 3. This embodiment is not illustrated.

Figure 9A:
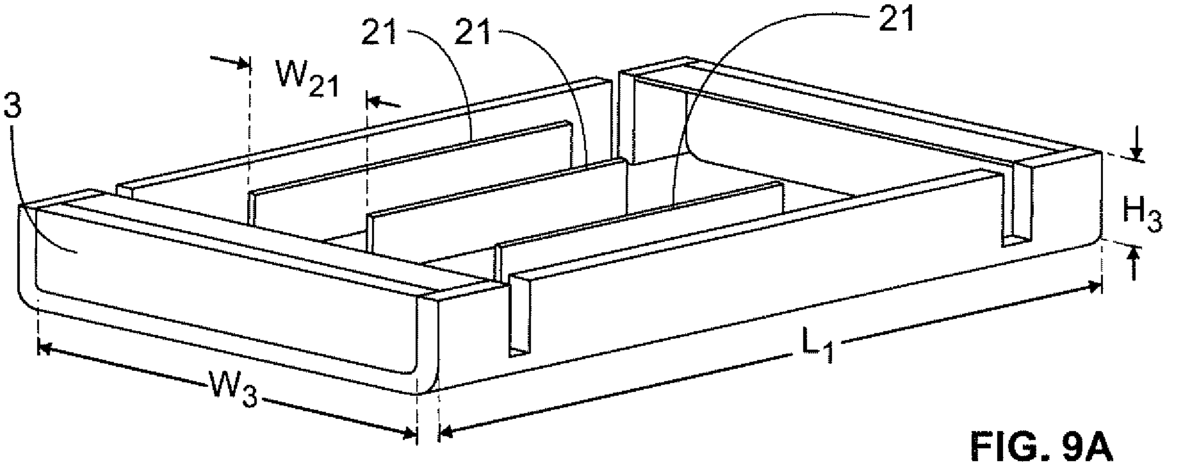
FIG. 9A illustrates an extra-wide enclosure design for processing large amounts of bean pods. Baffles are provided to assist the alignment of beans prior to cutting.
Figure 9B:
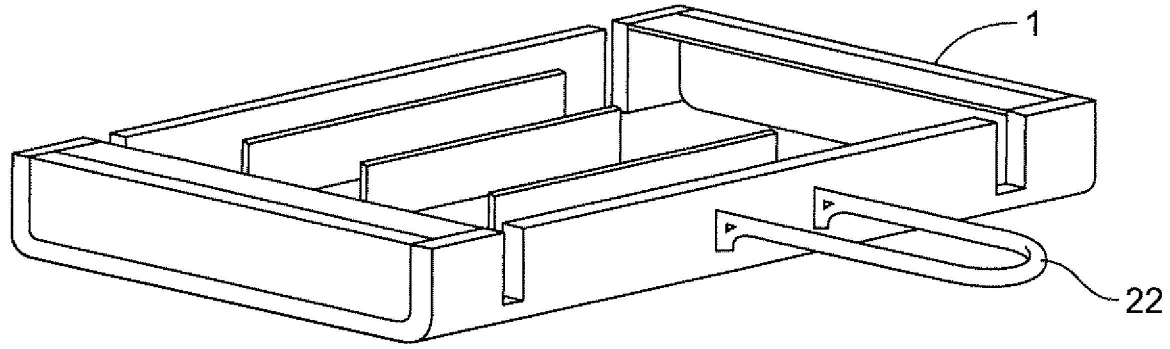
FIG. 9B illustrates the use of an optional handle which assists the shaking and tilting steps used to align the bean against the alignment panels.

FIG. 9A depicts a wide body adaptation of the novel bean end cutter of FIG. 1A. This design is particularly useful for institutional use with restaurants or with high end grocery stores where food is prepared, for example. In this important embodiment, width $W_3$ of end panel 3, is not restricted to what can be grasped in a onehanded operation. For example, $W_3$ can easily exceed 3 inches and is only limited by the volume of beans that can be picked up by the user with two hands grasping the body of bean end cutter 1, or optionally using, handle 10, as illustrated in FIG. 9B. The volume of beans in the enclosure 1 is of course dictated by the selection of enclosure length L1 and height of end panels 3. Since width $W_3$, in this design can easily exceed the bean length, alignment baffles 21 serve to keep the enclosed beans in parallel alignment during the cutting operation. The distance $W_{21}$ between baffles 21 should not exceed the minimum bean length inserted into the novel bean end cutter 1.

FIG. 9B illustrates use of optional handle 22 attached to the main body of the bean end cutter 1.

Figure 9C:
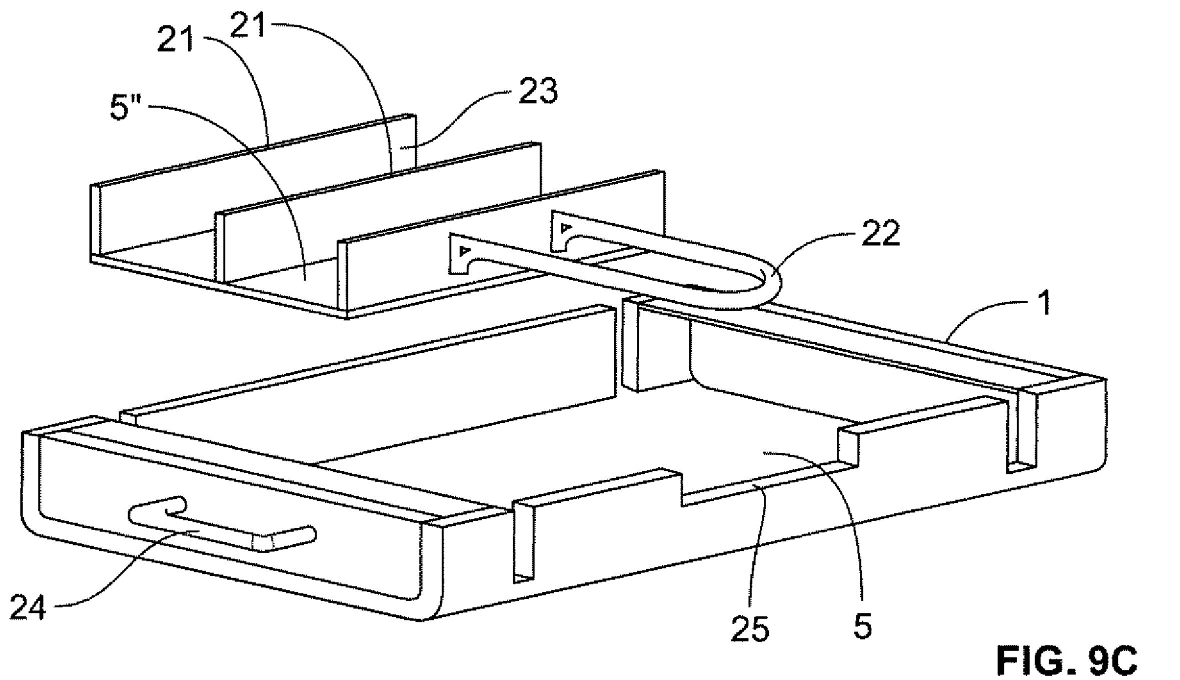
FIG. 9C illustrates the use of a removable pan with mounted baffles to facilitate separated cut beans from the bean ends. Handles in cooperation with either the removable pane and/or the main body of the bean end cutter are illustrated.

FIG. 9C illustrates an embodiment wherein a pan 23, having a bottom panel 5', is movably inserted into the main body of bean end cutter 1. Baffles 21 are attached to bottom panel 5' to form the removable pan 23. In this embodiment bottom panel 5' form a floor of pan 23 which is placed above bottom panel 5 of the main body of bean cutter 1. Additionally, handle 22 is attached to the removal pan 23 to facilitate removal of pan 23 and its contents from the main body of the bean end cutter 1. A pair of optional handles 24 (one handle is hidden in drawing) are attached to the main body of the bean end cutter 1 to facilitate the alignment of beans. Handle 22 fits in the recessed area 25 in one of the primary side panels.

Figure 10A:
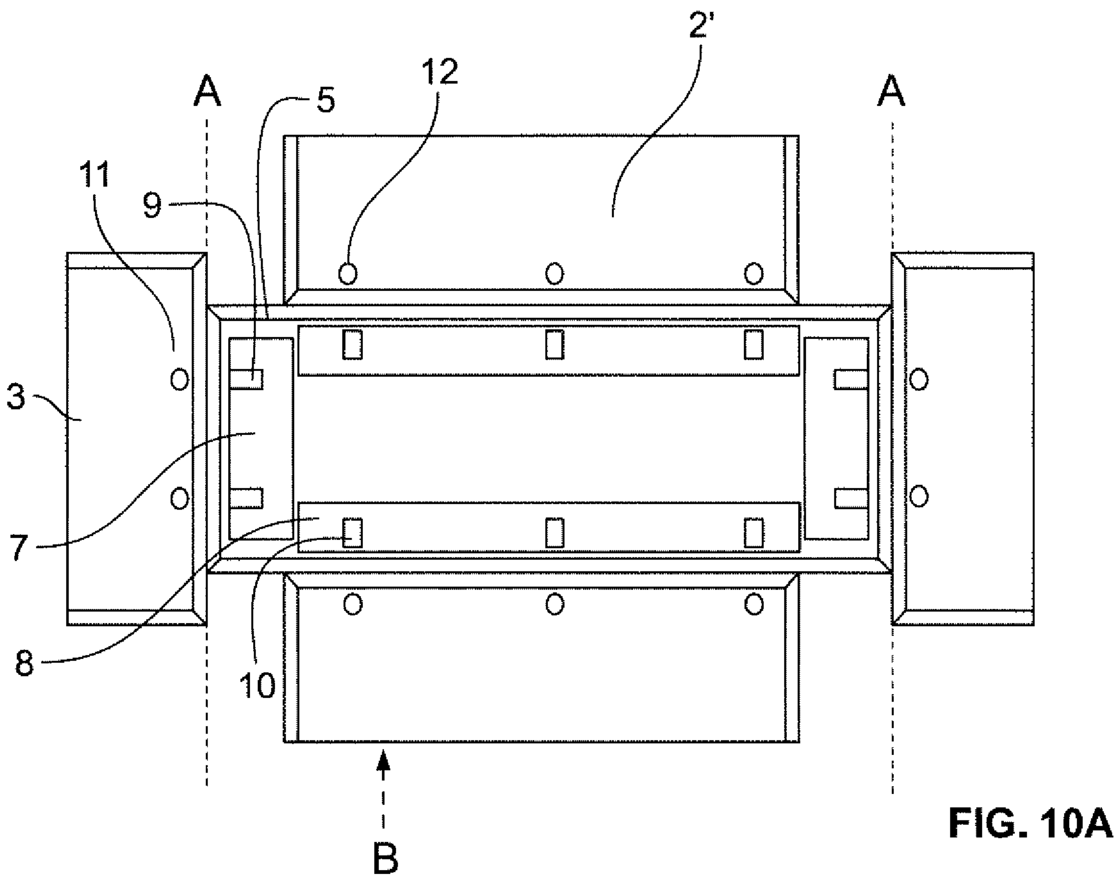
FIG. 10A illustrates hinged bean cutting enclosure, allowing all end and side panels to lie flat for storage purposes.
Figure 10B:
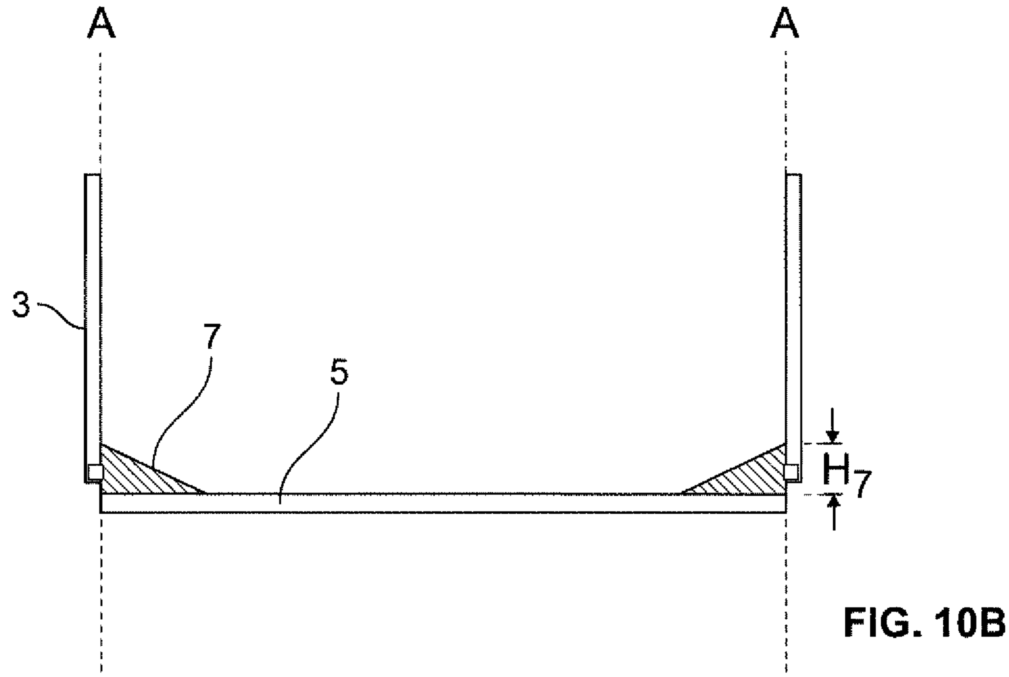
FIG. 10B shows a side view of FIG. 10A from view “B” indicated in FIG. 10A. after panels 3 have been locked into place in their vertical position related to bottom panel 5.

FIG. 10A illustrates a top view regarding a collapsible version of the bean end cutter as illustrated in FIG. 1B. A collapsible bean cutter is advantageous since it can be easily stored, since the walls 2' and 3, when collapsed, lie essentially on the same plane as bottom panel 5. Panels 3 and 5 are attached along hinge lines A. Panels 3 and 5 are both beveled at 45-degree angles so that when they lie perpendicular to each other when the user positions them for use after storage. As can be seen in FIG. 10B, all panels 3 and 2 move upright relative to bottom panel 5 and lock into locking members 7 and 8, which are situated on bottom panel 5. Locking members 7 serve to attach side panels 3 with bottom panel 5, while locking members 8 serve to lock primary panels 2' with bottom panel 5. As illustrated, locking members 7 and 8 are equipped with receiving holes 9 and 10 to receive mating pins 11 and 12, located in panels 3 and 2' respectively.

FIG. 10B shows a side view of FIG. 10A from view "B" indicated in FIG. 10A. after panels 3 have been locked into place in their vertical position related to bottom panel 5. It is readily shown in FIG. 10B that locking members 7 which are attached to bottom panel 5 is tapered allowing beans inserted into bean end cutter to move against inner surface of side panel 3. If for example, locking members 7 were simply rectangular in cross section from the perspective in FIG. 10B, then beans would bump up against a vertical wall presented by a rectangularly shaped locking member cross section. The angle of taper of the surface of member 7 facing the inside of enclosure 1 relative to the bottom panel of member is chosen to provide sufficient height H7 of member 7 to allow sufficient hole size to stabilize panel 3 in the vertical position relative to bottom panel. Although not illustrated, the surface of locking member 8 facing the inside of enclosure 1 are similarly tapered so that they do no prevent beans in contact with locking members 8 from sliding towards end panels 3.

Many modifications are possible to fabricate a collapsible version of FIGS. 1A and 1B, for example. It is preferred to use "living hinges", as are well known in the art, in the fabrication of plastic versions of the inventive bean end cutters. Also, the living hinges can be made so that they toggle between a collapsed configuration for storage and the configuration where all side and end panels are in their upright position. Such a configuration would not necessarily require the use of locking members 7 and 8.

Other modification of the inventive bean end cutter of this invention are also possible. Regarding the materials of construction, the bean end cutter, or parts comprising the bean end cutter, can be made of any material that is preferably food grade and can be assembled or formed from a material of choice.

For example, food grade thermosetting plastics can be utilized to form the entire bean cutter using injection molding techniques. Alternatively, plastic panels, such as acrylic, polycarbonates can be bent into final form under heating conditions to form the final bean cutter enclosure.

Alternatively, panels 2', 2", 3, and 5 can be included in kit form and fabricated so they can be assembled by the user.

The bean cutter of the present invention can also be fabricated from metal panels that are welded or bend to form the final product. Also, stamping operations can be employed to cut a preformed shape which then can be bent into the final product. Any combination of bending, stamping, welding, or deep drawing techniques would be within the skill of the art to make the present invention.

Also, this invention is not limited to using flat panels or 90-degree panel orientations as shown in the drawings. Primary and auxiliary panels 2" and 2', for example, can be curved in cross section for aesthetic or utility purposes.

Further, the enclosure can be made of any combination of the embodiments as illustrated in the Figures, such as flared side panels 2', use of wide end plates 3, use or omission of auxiliary side panels 2", use of top retaining bars 11, which can be movable or stationary, or use of movable clips 15A,15B.

Also, auxiliary equipment such blades which are included for use with the inventive bean end cutter, or blades mounted above cutting slots 4 as part of the bean cutter are within the scope of the present invention. Also, the aforementioned blades mounted in cooperation with cutting slots 4 can be preferably spring loaded.

Additionally, accessories or improvements to store the inventive bean cutter when not in use are within the scope of the invention. The bean end cutter of the present invention can be equipped with conventional fastening means to attach to horizontal or vertical surface such as a wall or inside or under a cabinet or instance. For example, holes or loops can be associated with any of the panels of the bean cutter to mount against a vertical wall or under a counter. Velcro, sticky or magnetic adhesive devices can be used in conjunction with the present invention to attach to a convenient storage surface. Such devises can also be included in the kit to assemble the bean end cutter as mentioned earlier or provided with a preassembled bean end cutter.

Further, the placement of a rubber or cutting pad on the top surface of the bottom panel 5 to facilitate cutting is a modification possible (not illustrated).

Figure 11:
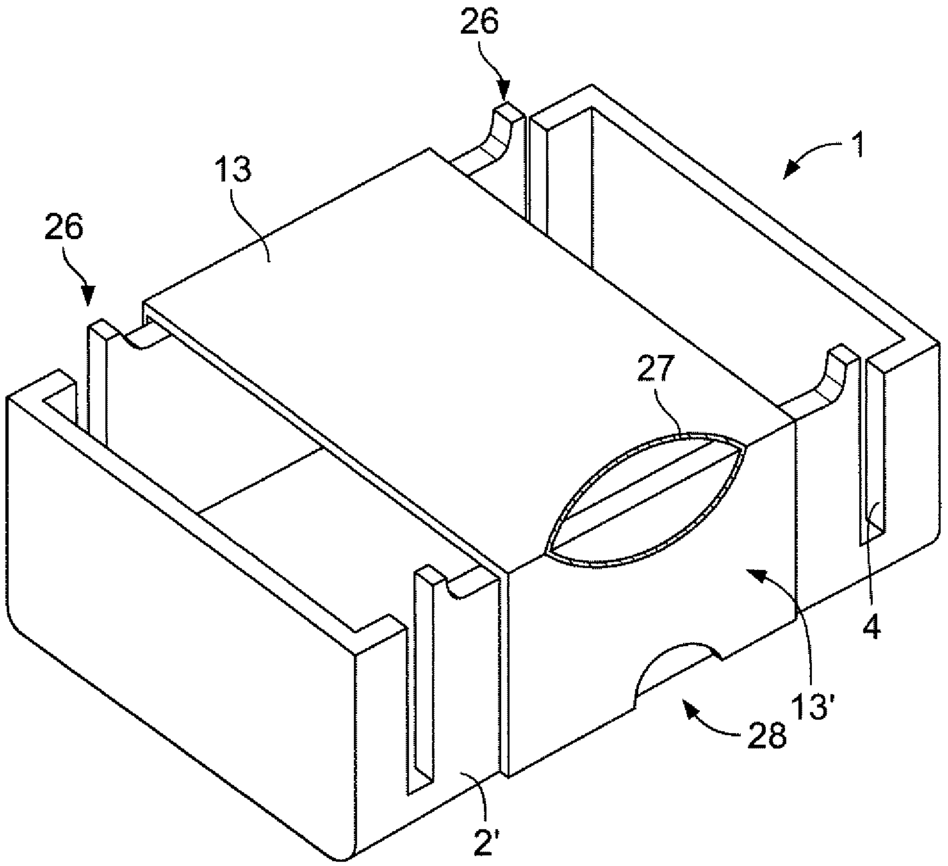
FIG. 11 illustrates the use of cutting guide stops attached to each end of primary side panels 2'. Additionally.

FIG. 11 illustrates the use of cutting guide stops 26 attached to each end of primary side panels 2'. Though not necessary, cutting guides stops 26 facilitate the placement of cutting means 10 (not shown), which are inserted into cutting slots 4. In use, the preparer can easily swing a knife blade along the top of the bean cutter 1 until it is stopped by the cutting guide stops 26. The preparer then lowers the knife into slots 4 until bean ends are cut.

FIG. 11 also illustrates a modification of lid 13 shown in FIG. 4B. As explained earlier, lid 13, having side panels 13', projecting substantially at right angles from each end, can slide freely over the top of the enclosure and/or can snap in place over the enclosure 1. In an embodiment shown in FIG. 11, lid 13 are provided with cutouts 27 and 28. Cutout 27 allows the preparer to grasp top lid 13 simultaneously with the underlying primary panel 2'. This allows the preparer to move, tilt and shake the bean cutter from a one hand operation by simply grasping the side panels 13' of top lid 13. As stated earlier, the function of lid 13 is to assist the containment of bean pods within the enclosure during the tilting and shaking steps in the description of FIG. 2.

Additionally, lid 13 also serves as a tray to retain the cut beans after the bean end cutter 1 is inverted. When the lid 13 is used as a tray (instead of using one's hand to hold the cut beans), cutouts 28 provided in the side panels 13' at the ends of top lid 13, allow the preparer to hold the bean end cutter 1 and remove lid 13. The lid 13, now functioning as a tray, retains the cut beans, leaving the bean ends behind. Lid 13 is typically is used with bean end cutters which are more than about 2.5 to 3 inches in height, since the normal hand size would not be able to hold more cut beans.

Figure 12:
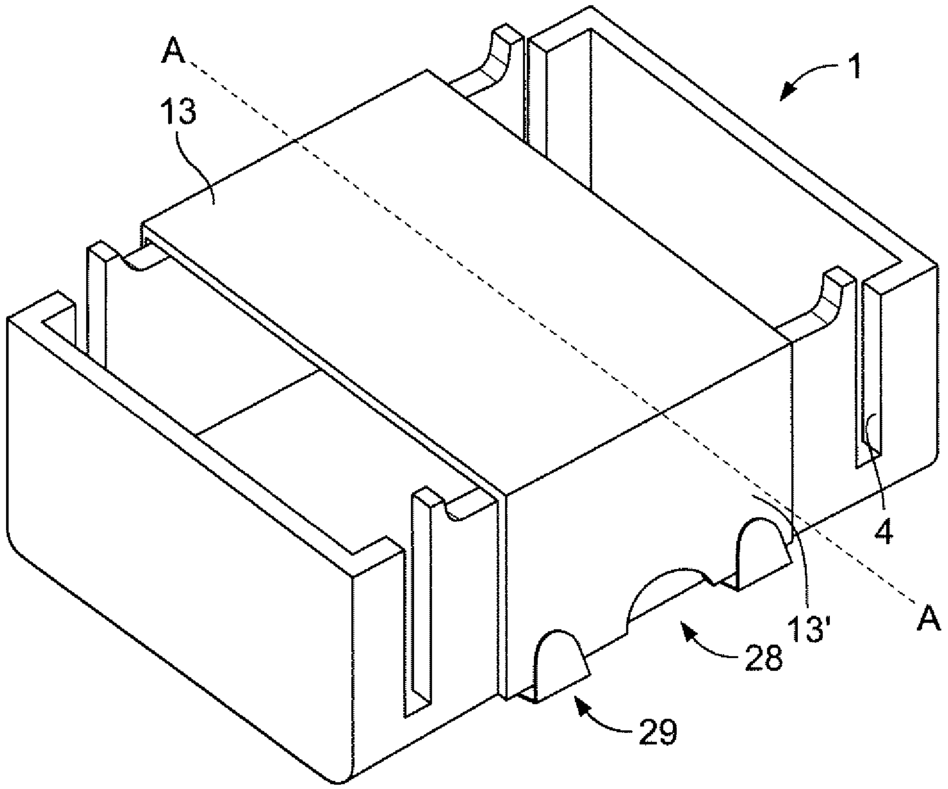
FIG. 12 illustrates a set of clips on the bean end cutter to assist securing the ends of the top lid.

FIG. 12 shows another embodiment of lid 13, whereby a set of clips 29 assist securing the side panels 13' of top lid 13 to bean end cutter 1. The clips extend from a bottom of the bean cutter. It is also within the scope of the invention to apply the cutouts 27 as shown in FIG. 11 in addition to clips 29.

Figure 12A:
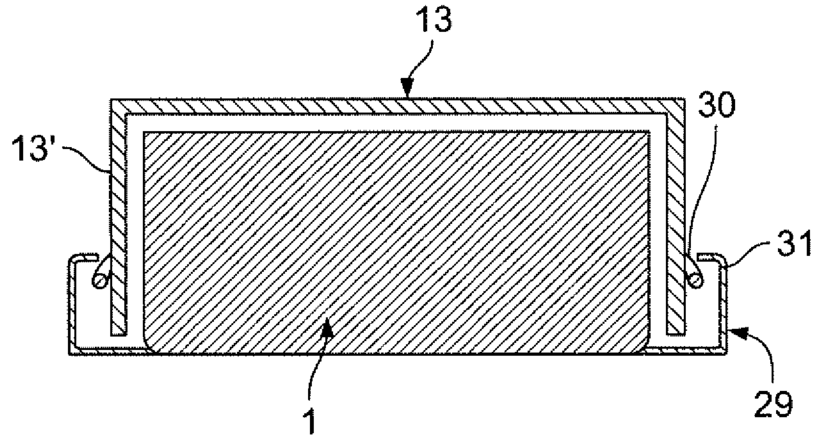
FIG. 12A is a cross sectional view over along line “A” of FIG. 12 illustrating the optional use of projections 30 attached to ends of the lid 13, which engage into a recess formed on the inside of the clips shown in FIG. 12.

FIG. 12A is a cross sectional view along line "A" (above clip 29) of FIG. 12 illustrating the optional use of projections 30, attached to ends of lid side panels 13' and facing clips 29. As shown in FIG. 12A, the projections 30 engage with recesses 31 presented on the engagement side of clips 29.

Figure 12B:
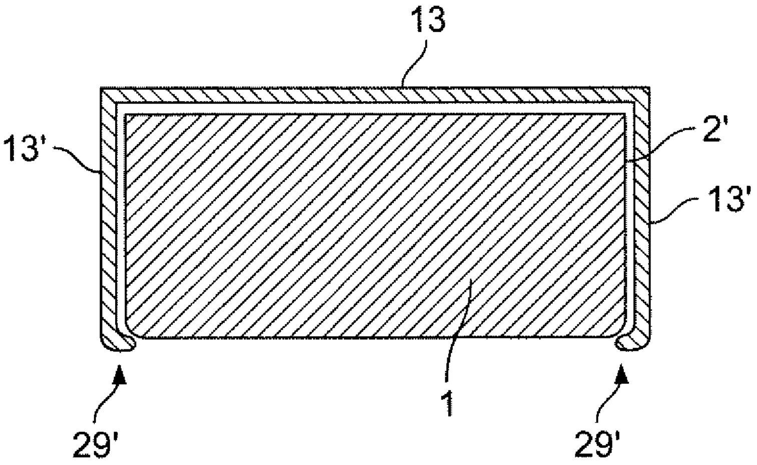
FIG. 12B is a cross sectional view along line “A” of FIG. 12. This embodiment omits the clips shown in FIG. 12 but instead utilizes a lip 29' formed at the inside edges of the lid side panel 13' to engage with the bottom edge of primary panel 2'.

FIG. 12B is a cross sectional view along line "A" of FIG. 12, illustrating another temporary fastening mechanism. This arrangement omits the use of clips 29, but instead, utilizes lips 29' formed at the inside edges of the ends of lid side panel 13' to engage with the bottom edge of primary panel 2'.

Figure 13:
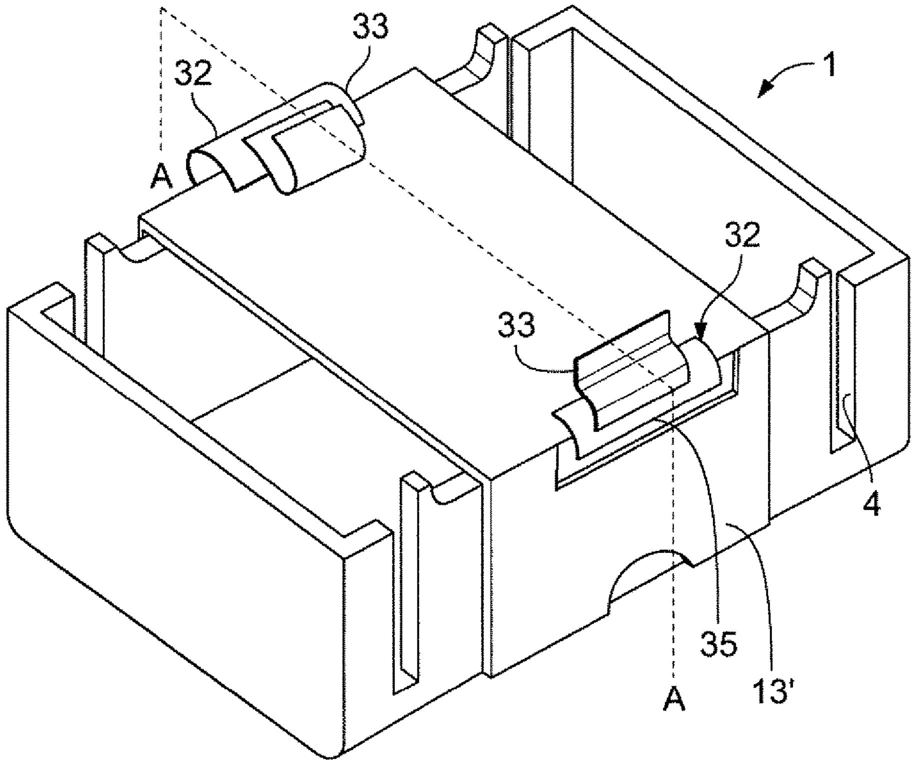
FIG. 13 illustrate a set of clasps 32, attached to lid 13, and designed to engage the primary panel through an open cutout 35 in the lid to removably secure the lid to the bean end cutter.
Figure 13A:
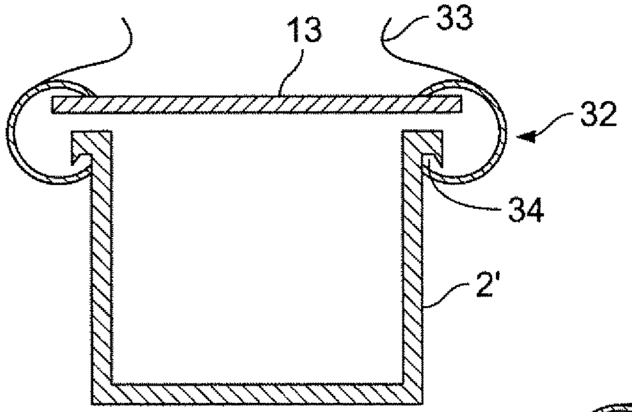
FIGS. 13A and 13B are side views through a cross section at line “A” of FIG. 13, which further illustrate how the clasps engage (FIG. 13A) or disengage (FIG. 13B) the lid 13 from the bean end cutter.

FIG. 13 illustrates yet another embodiment wherein a set of clasps 32 are attached to lid 13, each clasp 32 including a grasping handle 33. The lid 13 also has an open cutout 35 that is associated with each clasp 32. The end of each clasp 32 can move through the open cutout 35 and engage a lip 34 formed at the top of primary panel 2'. FIG. 13A is a cross sectional view along line A of FIG. 13. FIG. 13A illustrates clasp 32 in its normally locked position, where lid 13 is locked to primary panel 2' by engagement of each lip 34 by each clasp 32.

Figure 13B:
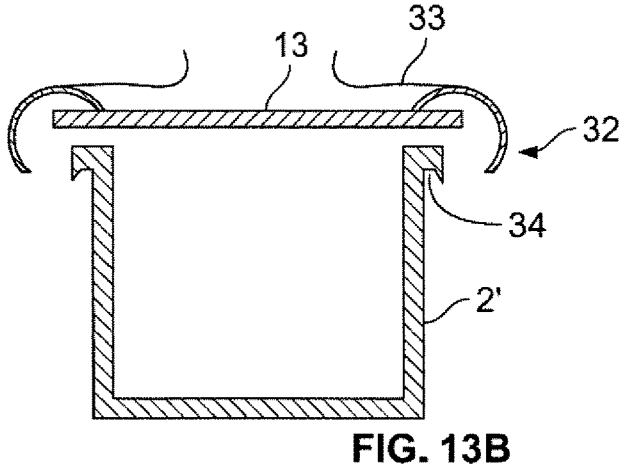

FIG. 13B shows lid 13 in its unlocked position, wherein the clasps are moved toward a center of the lid 13 to allow removal of lid 13 from the bean end cutter 1. The preparer unlocks the lid by squeezing on both grasping handles 33 at each side of lid 33. This action releases clasp 32 from lip 34 on the primary panel 2'. The clasps 32 can be made of spring metal, or an elastic plastic strip or equivalent. In another embodiment, the clasp 32 can be designed to form a bistable living hinge at the location of attachment with lid 13. In this situation, the clasp retains its previous "closed" or "open state". For example, when a bistable clasp is "opened" or released from lip 34, the top lid can be removed from bean end cutter 1. The next time the preparer wants to secure the lid 13 to the bean end cutter 1, he/she would then manipulate the handles 33 to move the clasps 32 into their locked position.

Other possibilities include supplemental frictional surfaces at points of contact between lid side panels 13' and primary panel 2'. For example, rough surfaces can be molded into the abutting surfaces of one or both of the lid side panels 13' or the primary panel 2". Also, an adhesive "friction" film or tape can be applied to the abutting surfaces of lid 13 and panel 2'.

I claim:

1. A bean end cutter comprising, a bottom panel having at least two opposing primary side panels and two opposing end alignment panels, each panel in attachment to the bottom panel; forming an enclosure wherein;

the enclosure has a top opening opposing the bottom panel, the top opening formed between the two opposing primary side panels and the two opposing end alignment panels, wherein;

the enclosure is sized for the placement of beans, and including opposing cutting slots extending upward from the bottom panel, each of the opposing cutting slots formed between an edge surface of the primary side panels and an adjacent end alignment panel, wherein;

a removable lid member is positioned above the two opposing primary panels to assist confinement of beans placed in the enclosure; wherein the removable lid member further comprises two lid side panels which can be fastened to the opposing primary side panels of the enclosure.

2. The bean end cutter of claim 1, wherein the lid member includes at least one cutout portion between the top of lid and the ends of the two lid side panels.

3. The bean end cutter of claim 1, wherein the lid member includes at least one cutout portion at ends of the two lid side panels.

4. The bean end cutter of claim 1, wherein the bean end cutter 1 is provided with clips, to fasten the lid side panels to the bean end cutter.

5. The bean end cutter of claim 4, wherein the inner surface of clips, are provided with a recess to engage with a protrusion at the outer surface of the lid side panels to further secure the lid side panels to the bean end cutter.

6. The bean end cutter of claim 1, wherein inside edges of the ends of lid side panel engage with a bottom edge of the primary panel to removably fasten the lid to the bean end cutter.

7. The bean end cutter of claim 1, wherein clasps are attached to the top of lid engage through open cutouts in the lid side panel onto a lip format the top of the primary panel.

8. A bean end cutter comprising, a bottom panel having at least two opposing primary side panels and two opposing end alignment panels, each panel in attachment to the bottom panel; forming an enclosure wherein;

the enclosure has a top opening opposing the bottom panel, the top opening formed between the two opposing primary side panels and the two opposing end alignment panels, wherein;

the end alignment panes are of wider width relative to the opposing primary side panels to minimize egress of beans through the cutting slots, and further, wherein;

the enclosure is sized for the placement of beans, and including opposing cutting slots extending upward from the bottom panel, each of the opposing cutting slots formed between an edge surface of the primary side panels and an adjacent end alignment panel, wherein;

cutting guide stops are attached to the upper edge surface of the primary panels adjacent to the cutting slots.

9. A bean end cutter comprising, a bottom panel having two opposing primary side panels and two opposing end alignment panels each panel in attachment to the bottom panel; forming an enclosure wherein;

the enclosure has a top opening opposing the bottom panel, the top opening formed between the two opposing primary side panels and the two opposing end alignment panels, and further, including auxiliary side panels, each auxiliary side panel extending from an end of each of the end alignment panels, wherein:

the enclosure is sized for the placement of beans, and including opposing cutting slots extending upward from the bottom panel, each of the opposing cutting slots formed between an edge surface of the auxiliary side panel and an edge surface of the primary side panels and spaced from a respective opposing end alignment panel so that ends of beans placed in the enclosure can be cut off, and further wherein:

cutting guide stops are attached to the upper edge surface of the primary panels adjacent to the cutting slots.

* * * * *